(12) United States Patent
Holzer et al.

(10) Patent No.: US 7,144,542 B2
(45) Date of Patent: *Dec. 5, 2006

(54) LABEL FILM WITH IMPROVED ADHESION

(75) Inventors: Susanne Holzer, Ottweiler (DE); Gerhard Wieners, Frankfurt (DE); Albert Lauer, Neunkirchen (DE)

(73) Assignee: Trespaphan GmbH, Neunkirchen (DE)

( * ) Notice: Subject to any disclaimer, the term of this patent is extended or adjusted under 35 U.S.C. 154(b) by 27 days.

This patent is subject to a terminal disclaimer.

(21) Appl. No.: 10/433,796

(22) PCT Filed: Dec. 5, 2001

(86) PCT No.: PCT/EP01/14278

§ 371 (c)(1), (2), (4) Date: Jun. 5, 2003

(87) PCT Pub. No.: WO02/45956

PCT Pub. Date: Jun. 13, 2002

(65) Prior Publication Data

US 2004/0028932 A1 Feb. 12, 2004

(30) Foreign Application Priority Data

Dec. 6, 2000 (DE) ................... 100 60 504
Jun. 13, 2001 (DE) ................... 101 28 711

(51) Int. Cl.
*B29C 47/06* (2006.01)
*B32B 27/08* (2006.01)

(52) U.S. Cl. ............... 264/331.18; 264/173.14; 264/173.16; 264/211; 264/509

(58) Field of Classification Search ........ 264/259, 264/331.15, 331.17, 331.21, 211, 483, 469; 156/244.11, 245
See application file for complete search history.

(56) References Cited

U.S. PATENT DOCUMENTS

| | | | |
|---|---|---|---|
| 3,108,850 A * | 10/1963 | Brandt | 264/509 |
| 4,629,657 A * | 12/1986 | Gulati et al. | 428/461 |
| 5,242,650 A | 9/1993 | Rackovan et al. | |
| 5,435,963 A * | 7/1995 | Rackovan et al. | 264/509 |
| 5,501,905 A * | 3/1996 | Krallmann et al. | 428/339 |
| 5,851,610 A * | 12/1998 | Ristey et al. | 428/34.9 |
| 5,885,721 A * | 3/1999 | Su et al. | 428/516 |
| 6,033,514 A * | 3/2000 | Davis et al. | 156/244.11 |
| 6,042,930 A * | 3/2000 | Kelch et al. | 428/195.1 |
| 6,150,013 A | 11/2000 | Balaji et al. | |
| 6,689,857 B1 * | 2/2004 | Larter et al. | 526/348.5 |
| 6,761,848 B1 * | 7/2004 | Jud | 264/284 |
| 6,838,042 B1 * | 1/2005 | Wieners et al. | 264/509 |
| 6,844,079 B1 * | 1/2005 | Holzer et al. | 428/520 |

FOREIGN PATENT DOCUMENTS

| | | |
|---|---|---|
| EP | 0 065 898 A1 | 12/1982 |
| EP | 0065898 B1 * | 8/1985 |
| EP | 0 367 613 A2 | 5/1990 |
| GB | 1534001 * | 11/1978 |
| GB | 2 223 446 A | 4/1990 |
| JP | 08207214 | 8/1996 |
| WO | WO 98/14491 A1 | 4/1998 |
| WO | WO 00/21854 A1 | 4/2000 |

* cited by examiner

*Primary Examiner*—Mark Eashoo
(74) *Attorney, Agent, or Firm*—ProPat, L.L.C.

(57) ABSTRACT

The invention relates to the use of a biaxially oriented polyolefin film as a label film. The inventive film consists of a base layer and at least one cover layer. Said cover layer contains as the main component a copolymer or terpolymer consisting of one alkene and unsaturated carboxylic acids or the esters thereof and low amounts of an additive. The cover layer is characterized by excellent and divers adhesion to various polymer materials from which containers are formed. It is no longer necessary to apply adhesives, primers, coatings etc. in a separate step after production of the film.

53 Claims, No Drawings

LABEL FILM WITH IMPROVED ADHESION

The invention relates to the use of a biaxially oriented thermoplastic film for labels having improved adhesion to various materials, specification to the labels themselves, and to a process for the production of the labels.

BACKGROUND OF THE INVENTION

Foods and other goods are frequently packed in rigid-walled containers which, as early as during production, are provided with a label by the "in-mould labelling" or "IML method". In this method, a label is laid, usually by a robot, in the open mould in such a way that the printed (out)side of the label is in contact with the mould wall, while the unprinted (inside) faces the container to be shaped. Flat, fold-free lying of the label in the mould is achieved, for example, by means of a vacuum applied to fine air-removal perforations, with the perforations being substantially sealed by the label. Alternatively, electrostatic forces between the electrostatically charged label and the earthed mould ensure flat lying of the label.

The advantage of the IML method is that the print quality of the separately produced labels is significantly better than direct printing of the containers. Application of the label during shaping of the container is inexpensive and effective. There is no need for adhesives, coated backing films or papers and it is therefore not necessary to dispose of waste and residues. The in-mould labelling method can be combined with various container production processes. Variants of the IML method have been proposed or already developed for, for example, injection moulding, thin-wall injection moulding, blow moulding and thermoforming and the injection stretch blow moulding of containers.

Furthermore, methods for labelling containers after their production or after their filling are known, such as, for example, wrap-around labelling, patch labelling, self-adhesive labels and thermolabelling.

Thermolabelling covers all methods in which a label is applied to a container under the action of heat. For example, the pre-shaped container can be heated in a suitable process and the label pressed onto the container wall by means of pressure or with the aid of brushes or rolls in such a way that it is subsequently firmly bonded to the container.

In both in-mould labelling and thermolabelling, bubble-free application of the label is an important and at the same time problematic requirement. In order to achieve this, the inside surface of the label film, i.e. the one facing the container, is frequently structured or roughened to simplify exit of air from the gap between label and container wall.

In the case of simple label shapes, the label is usually supplied in roll form and cut to size on the machine in which the container is shaped (cut in place). This method is particularly appropriate in the case of simple, for example rectangular, label shapes, as are used, in particular, in wrap-around labelling (WAL) and patch labelling of essentially cylindrical containers and bottles.

In the case of more complex outlines, the label is frequently cut to size in advance, stacked in magazines, later removed from the stack at the labelling machine and laid in the mould (cut & stack method). The labels here are firstly printed, for example, by the so-called sheet offset method or other suitable methods and cut to their final shape directly after the printing process. Both the unprinted and the printed sheets and labels must be readily processable in the individual process steps of sheet cutting, printing, label cutting and feeding to labelling. The sheet and the label are stacked and unstacked. In the process, the films must slide easily against one another and they must not become electrostatically charged. Besides providing the label film with lubricants and antistatics, corresponding structuring of the film surface is therefore necessary.

For the production of the containers, use is made of various materials, such as, for example, polypropylene (PP), high- or low-density polyethylene (HD-PE or LD-PE or LLD-PE, polystyrene (PS), polyvinyl chloride (PVC), polyethylene terephthalate PET; polycarbonate (PC) and in individual cases also mixtures of such polymers. This gives rise to various requirements of the label materials with respect to strength, extensibility, rigidity, gloss/mattness and adhesion to the container wall. For cost reasons, biaxially oriented polypropylene films (BOPP films) are preferably employed, these applications currently being restricted to containers made from polypropylene and polyethylene.

The conventional BOPP labels adhere, even at elevated temperatures, poorly to the other container materials mentioned. It is not possible to apply labels made from BOPP film to containers made from PET, PS, PC or PVC by means of in-mould or thermolabelling methods. In particular, it has hitherto not been possible to use BOPP films in the injection-moulding IML method on polystyrene. It has been just as unsuccessful to employ label films made from BOPP films in the thermolabelling method on PET bottles. Here, corresponding adhesives have to be applied for attaching the label. In spite of extensive attempts to combine various container materials and various label materials with the diverse known labelling methods, the choice of successful combinations remains very restricted. The direct use of BOPP films in the IML or thermolabelling method for the labelling of containers which do not consist of PP or PE has hitherto not been-possible. For the adhesion of BOPP labels to PS, PET, PC, PVC, etc., adhesives, coatings, lacquers or similar aids are necessary, it being necessary to apply these subsequently, i.e. after production of the film, in an additionally processing step. This firstly makes the label more expensive and sometimes has a disadvantageous effect on the other service properties.

British Application GB 2 223 446 discloses a BOPP film which consists of at least two layers, with the comparatively thinner layer consisting of a blend of a material which has low seal seam strength to PVDC and a material which consists of a copolymer of an alkene and an unsaturated monobasic acid or ester thereof. In preferred embodiments, suitable materials having low seal seam strength to PVDC are high- and low-density polyethylenes, and suitable copolymers are those of ethylene with acrylic acid esters, where, in particularly preferred embodiments, these copolymers can comprise unsaturated dibasic acids or anhydrides thereof, such as, for example, maleic anhydride, as further monomers. Corresponding copolymers and terpolymers have been described in EP 0 065 898.

On repetition of British Application GB 2 223 446, it was observed that the process described therein results, on use of the formulations indicated therein, in considerable deposits on the heating and stretching rolls of the longitudinal stretching unit of a sequential BOPP machine which are unacceptable for industrial practice. Variations within the limits of the disclosed teaching brought about no advantage or only a slight advantage with respect to the amount and speed of the roll coating built up, or other service properties were adversely affected.

The object of the present invention was to provide a biaxially oriented polyolefin film which is inexpensive and can be employed in a diverse manner as label film. The film should, in particular, be applicable by the IML or thermo-labelling method to containers made from various materials, such as, for example, PP, PE PET, PS, PC, PVC, etc. and should have good adhesion. It is of course necessary that the film can be produced without the formation of deposits on the rolls of the longitudinal stretching unit. In addition, the other important service properties and the appearance of the film, or of the label produced therefrom, should not be adversely affected. In particular, the film should be printable on one side and should be readily stackable and destackable in the processing process.

BRIEF DESCRIPTION OF THE INVENTION

This object is achieved by the method of making a label film, which method comprises converting a multilayered biaxially oriented polyolefin film comprising a base layer and at least one inner top layer, where this inner top layer comprises at least 70% by weight of a copolymer or terpolymer I built up at least from an olefin and an unsaturated carboxylic acid or esters thereof or anhydrides thereof, and not more than 30% by weight of an additive, wherein the data in % by weight are in each case based on the weight of the inner top layer into a label film. The dependant claims indicate preferred embodiments of the invention.

DETAILED DESCRIPTION OF THE INVENTION

Within the scope of the present invention, it has been found, surprisingly, that the inner top layer comprising the said copolymers and/or terpolymers I has excellent adhesion as a label to a very wide variety of polymer materials from which containers are usually shaped. It is thus possible, for the first time, to make available a material which, surprisingly, can be employed equally successfully for the labelling of containers made from PP or PE or PVC or PET or PC or PS by the thermolabelling or in-mould method. It has been found here that a small amount of an additive in the inner top layer comprising copolymer or terpolymer I effectively prevents roll deposits during production of the film and at the same time the desired good and diverse adhesion properties of the film are not impaired on use as an IML or thermolabelling label. In particular, it has been observed that a top layer built up only from the copolymer or terpolymer I sticks to the rolls or forms deposits during production of the film in such a way that handling of the material in the film production process is virtually impossible.

Surprisingly, the film according to the invention, on use thereof as label in the in-mould and thermolabelling method, exhibits excellent adhesion properties, not only to containers made from PP and PE. The film can also be applied extremely well as a label to containers made from PS, PVC, PC and PET without additionally adhesives, lacquers, coatings or other auxiliaries being necessary. On use according to the invention as label film in the IML or thermolabelling method, very good adhesion between label and container is found. Thus, a material which can be employed in a hitherto impossible breadth for a very wide variety of container materials is made available for the first time. This also has considerable logistical advantages.

Owing to these particular adhesion properties, this film can be used not only for the labelling of containers made from PP, PE, PS, PVC, PC and PET, but also in a specific application as lid film for containers made from PP, PE, PS, PVC, PC and PET. Suitable containers are containers of any desired shape, such as, for example, pots, dishes, casting parts, etc. It has been found that the inner top layer also has very good adhesion as a lid and seals the containers well and thus reliably protects them against contamination. At the same time, the film can be peeled off from the container without leaving a residue when the pack contents are to be removed. Known lid films in accordance with the prior art, after peeling-off from the container, frequently leave shred-like white skins at the edge or in the heat-sealing or embossing region of the container to which the film has been welded. These film residues, which then remain adhering to the container edge, may interfere with removal of the pack contents, cannot readily be identified by the consumer and are therefore unacceptable. As a further advantage, it has been found that the lid film can be applied at temperatures of <100° C., preferably from 70 to <100° C., and the good adhesion is already achieved at these temperatures. The container edge and/or the intermediate webs thus remain dimensionally stable.

It has furthermore been found that the film with its inner top layer also has excellent adhesion properties to surfaces made from paper, wood, metal, for example aluminium or tinplate. Owing to these adhesion properties, the film can advantageously be employed for further applications.

The film can be employed for lamination to other sheet-like substrates without an adhesive having to be applied for adhesion of the label to the substrate. For example, the film can be laminated directly, with excellent results, with its inner surface to paper, aluminium and other thermoplastic films. Furthermore, the film exhibits on the surface of the inner top layer increased adhesion to cold-sealing adhesives, printing inks and diverse coatings applied after production of the film. In a further application, the film exhibits improved adhesion in the case of metallization by means of vacuum vapour deposition.

The essential factors for these good adhesion properties is the structure and composition of the inner top layer of the film. This inner top layer faces the container during labelling and forms the bond between container and label. For corresponding applications as lid film, the inner top layer faces the container during application of the lid and forms the bond between lid film and container.

For the purposes of the present invention, the inner top layer is the top layer which faces the container during labelling and forms the bond between the container and the label during labelling. The structure and composition of the inner top layer are the essential factors for the good and diverse adhesion properties of the label. It has been found that the surface of the inner top layer has increased surface roughness, which simplifies destacking during the labelling process and supports bubble-free application. Surprisingly, the good and diverse adhesion properties are not impaired by this surface roughness.

The inner top layer comprises, as constituents which are essential to the invention, a copolymer or terpolymer I comprising an olefin and an unsaturated carboxylic acids or esters thereof or anhydrides thereof and an additive. If desired, the inner top layer additionally comprises antiblocking agents. In general, the inner top layer comprises at least 70% by weight, preferably from 80 to 99.5% by weight, in particular from 85 to 99% by weight, of the copolymer or terpolymer I, and at most 30% by weight, preferably from 0.5 to 20% by weight, in particular from 1 to 15% by weight, of the additive, in each case based on the weight of the inner top layer.

Suitable copolymers or terpolymers I are built up from olefins and unsaturated carboxylic acids or esters thereof or anhydrides thereof as monomers. Olefins are, for example, ethylene, propylene or 1-butene, if desired also higher homologues, such as, for example, hexene or octene. Unsaturated carboxylic acids include unsaturated mono- and dicarboxylic acids and esters or anhydrides thereof. Preferred unsaturated carboxylic acids are acrylic acid or methacrylic acid and esters thereof. In principle, the copolymer or terpolymer I can be built up from different olefins and different unsaturated carboxylic acids or esters/anhydrides thereof. Copolymers I comprising ethylene and acrylic acid ester or methacrylic acid ester are particularly advantageous.

Terpolymers I are generally built up from three different monomers (a), (b) and (c). The monomers (a) include the above-mentioned olefins, the monomers (b) are unsaturated carboxylic acids or esters thereof, and monomers (c) are carboxylic acid esters or carboxylic acid anhydrides which are different from (b). Preferred monomer (c) are unsaturated monocarboxylic acid esters, for example glycidyl methacrylate, or unsaturated dicarboxylic acids or an anhydride thereof, such as, for example maleic acid or maleic anhydride. Terpolymers comprising (a) ethylene, (b) acrylic acid or methacrylic acid or esters thereof and (c) glycidyl methacrylate or maleic anhydride are particularly advantageous.

The esters of the unsaturated carboxylic acids described are derived from one or more lower alcohols. Methyl, ethyl, n-propyl, i-propyl, n-butyl, i-butyl, sec-butyl or tert-butyl esters, for example, are suitable.

The composition of the copolymers or terpolymers I comprising the respective monomers can vary within the limits described below. Copolymers I generally comprise at least 60% by weight, preferably from 70 to 97% by weight, of olefin, preferably ethylene, and at most 40% by weight, preferably from 3 to 30% by weight, of unsaturated carboxylic acids or esters thereof, preferably acrylic acid or methacrylic acid or esters thereof. Terpolymers I generally comprise (a) from 65 to 96% by weight, preferably from 72 to 93% by weight, of olefin, preferably ethylene, and
(b) from 3 to 34% by weight, preferably from 5 to 26% by weight, of unsaturated carboxylic acids or esters thereof, preferably acrylic acid or methacrylic acid or esters thereof, and
(c) from 1 to 10% by weight, preferably from 2 to 8% by weight, of unsaturated mono- or dicarboxylic acids or esters thereof or an anhydride thereof which are different from (b), preferably maleic anhydride or glycidyl methacrylate.

The above-described copolymers or terpolymers I of the inner top layer generally have a melting point of from 40 to 120° C., preferably from 60 to 100° C. The Vicat point (in accordance with DIN 53460) is preferably in the range from 30 to 90° C. The melt flow index is generally from 0.1 to 20 g/10 min (190° C., 21.6 N), preferably from 0.1 to 15 g/10 min.

As a further essential component, the inner top layer comprises an additive in an amount of from 1 to 30% by weight, based on the weight of the inner top layer, preferably a wax, preferably polyethylene waxes, or paraffins. Polyethylene waxes are low-molecular-weight polymers which are essentially built up from ethylene units and are partly or highly crystalline. The polymer chains from the ethylene units are extended molecules, which may be branched, with relatively short side chains predominating. In general, polyethylene waxes are prepared by direct polymerisation of ethylene, if desired with use of regulators, or by depolymerisation of polyethylenes of relatively high molecular weights. The polyethylene waxes preferably have a mean molecular weight Mn (number average) of from 200 to 5000, preferably from 400 to 2000, particularly preferably from 400 to 1000, and preferably have a molecular weight distribution (poly-dispersity) Mw/Mn of less than 3, preferably from 1 to 2. The melting point is generally in the range from 70 to 150° C., preferably from 80 to 100° C.

Paraffins include macrocrystalline paraffins (paraffin waxes) and microcrystalline paraffins (microwaxes). Macrocrystalline paraffins are obtained from vacuum distillate fractions in the processing of lubricating oils. Microcrystalline paraffins originate from the residues of vacuum distillation and the sediments of paraffinic crude oils (deposition paraffins). Macrocrystalline paraffins consist predominantly of n-paraffins which additionally contain isoparaffins, naphthenes and alkylaromatic compounds, depending on the degree of refining. Microcrystalline paraffins consist of a mixture of hydrocarbons which are predominantly solid at room temperature. In contrast to the situation in macrocrystalline paraffins, isoparaffins and naphthenic paraffins predominate. Microcrystalline paraffins are distinguished by the presence of crystallisation-inhibiting, highly branched isoparaffins and naphthenes. For the purposes of the invention, paraffins having a melting point of from 60 to 100° C., preferably from 60 to 85° C., are particularly suitable.

In a further embodiment, the inner top layer may comprise, as additive, one or more other component which prevents or prevent deposits during film production in the same way as the wax. The proportion of additives of this type is generally between 2 and 30% by weight, preferably from 3 to 20% by weight, in particular from 3 to 10% by weight, with the proportion of copolymer or terpolymer I in the composition of the inner top layer being reduced correspondingly. Suitable additives of this type are polyolefins, polystyrene, polyesters, polyamides and hydrocarbon resins.

Particularly suitable polyolefins are those with no carboxylic acid monomers. Particular preference is given to polyolefins which are described below as copolymers and terpolymers II in connection with the outer top layer, in particular propylene polymers or polyethylenes. Suitable polyethylenes are both linear and branched polyethylenes, for example MDPE, VLDPE, LLDPE, LDPE or HDPE.

Suitable hydrocarbon resins are natural or synthetic resins having a softening point of 80–180° C., such as, for example, hydrocarbon resins, ketone resins, colophony, dammar resins, polyamide resins and aliphatic and aromatic hydrocarbon resins.

In in-mould labelling or thermolabelling, it is particularly desirable for bubble-free application of the label that the inner surface of the label film is appropriately structured in order to simplify exit of the air from the gap between label and container wall. It has been found that blending of the copolymers and terpolymers I with polyethylenes as additive contributes to a rough surface of the inner top layer, which has a favourable effect on "air removal" during labelling. PE-containing compositions of this type for the inner top layer are therefore particularly advantageous with respect to the appearance of the applied label.

If desired, the inner top layer may also comprise mixtures of the above-mentioned additives, particular preference being given to mixtures of wax and polyethylene. Combinations of 1–10% by weight of wax and 1–10% by weight of polyolefin, in particular copolymers II or polyethylenes (in each case based on the weight of the top layer), are particularly advantageous here with respect to deposits during film production without reducing the adhesion properties of the label.

Besides conventional label applications, surface protection of articles of use plays an important role. A protective film which can later be removed again without problems is applied to scratch-sensitive and fragile materials, such as, for example, glass, for transport. To this end, a certain adhesion of the film to the material to be protected is necessary in order that the protective film does not fall off prematurely. At the same time, however, the adhesion must not be excessively great in order that trace-free removal is facilitated. It has been found that embodiments with a copolymer as additive, in particular a propylene copolymer, such as, for example, propylene-ethylene copolymers having a C2 content of from 2 to 10% by weight, are particularly advantageous for these applications, it being possible for this purpose to increase the content of copolymer up to 50% by weight, based on the weight of the top layer.

The inner top layer may additionally comprise conventional additives, such as neutralisers, stabilisers, antistatics, antiblocking agents and/or lubricants, in effective amounts in each case. The data in % by weight below are in each case based on the weight of the inner top layer. Particular preference is given to embodiments which additionally comprise antiblocking agents in the inner top layer. It has been found that the antiblocking agent contributes towards reducing the deposits (pick-off) during production of the film.

Suitable antiblocking agents are inorganic additives, such as silicon dioxide, calcium carbonate, magnesium silicate, aluminium silicate, calcium phosphate and the like, and/or incompatible organic polymers, such as polyamides, polyesters, polycarbonates and the like, or crosslinked polymers, such as crosslinked polymethyl methacrylate, or crosslinked silicone oils. Silicon dioxide and calcium carbonate are preferred. The mean particle size is between 1 and 6 µm, in particular 2 and 5 µm. The effective amount of antiblocking agent is in the range from 0.1 to 5% by weight, preferably from 0.5 to 3% by weight, in particular from 0.8 to 2% by weight.

Lubricants are higher aliphatic acid amides, higher aliphatic acid esters and metal soaps, as well as polydimethylsiloxanes. The effective amount of lubricant is in the range from 0.01 to 3% by weight, preferably from 0.02 to 1% by weight, based on the inner top layer. Particularly suitable is the addition of from 0.01 to 0.3% by weight of aliphatic acid amides, such as erucamide, or from 0.02 to 0.5% by weight of polydimethylsiloxanes, in particular polydimethylsiloxanes having a viscosity of from 5000 to 1,000,000 mm$^2$/s.

In a preferred embodiment, the surface of the inner top layer is corona-, plasma- or flame-treated. It has been found that a surface treatment of this type, in particular the corona treatment, improves the adhesive strength of the inner top layer to the various polymer materials.

The thickness of the inner top layer is generally greater than 0.3 µm and is preferably in the range from 0.5 to 5 µm, in particular from 1 to 3 µm.

In accordance with the invention, films applied to a container with the above-described inner top layer in the IML method or by the thermolabelling method have very good adhesive strengths not only to PP and PE containers. The adhesive strengths to PVC, PS and PET containers are also excellent. On use in the thermolabelling method, an adhesive strength of >0.5 N/15 mm, generally >1.0 N/15 mm, is achieved at temperatures of the container wall of 130° C. and at a sealing pressure of 10 N/cm$^2$ and at a pressing time of 0.5 sec.

The above-described inner top layer having the composition according to the invention can advantageously be applied to transparent or opaque base layers. For the purposes of the present invention, "opaque film" means a non-transparent film whose light transparency (ASTM-D 1003-77) is at most 70%, preferably at most 50%.

For transparent embodiments, the base layer of the film generally comprises at least 85% by weight, preferably from 90 to <100% by weight, in particular from 95 to 99% by weight, in each case based on the base layer, of a polyolefin. Polyolefins are, for example, polyethylenes, polypropylenes, polybutylenes or copolymers of olefins having from two to eight carbon atoms, amongst which polyethylenes and polypropylenes are preferred.

In general, the propylene polymer comprises at least 90% by weight, preferably from 94 to 100% by weight, in particular from 98 to <100% by weight, of propylene. The corresponding comonomer content of at most 10% by weight or from 0 to 6% by weight or from 0 to 2% by weight generally consists, if present, of ethylene. The data in % by weight are in each case based on the propylene polymer.

Preference is given to isotactic propylene homopolymers having a melting point of from 140 to 170° C., preferably from 150 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymer is generally from 0.5 to 10% by weight, preferably from 2 to 5% by weight, based on the starting polymer. The molecular weight distribution of the propylene polymer can vary. The ratio between the weight average molecular weight $M_w$ and the number average molecular weight $M_n$ is generally between 1 and 15, preferably from 2 to 10, very particularly preferably from 2 to 6. Such a narrow molecular weight distribution of the propylene homopolymer of the base layer is achieved, for example, by peroxidic degradation thereof or by preparation of the polypropylene by means of suitable metallocene catalysts.

In a preferred embodiment, the base layer is opaque through the addition of fillers. In general, the base layer in this embodiment comprises at least 70% by weight, preferably from 75 to 99% by weight, in particular from 80 to 98% by weight, in each case based on the weight of the base layer, of the above-described polyolefins or propylene polymers, where the propylene homopolymers described are likewise preferred.

The opaque base layer comprises fillers in a maximum amount of 30% by weight, preferably from 1 to 25% by weight, in particular from 2 to 20% by weight, based on the weight of the base layer. For the purposes of the present invention, fillers are pigments and/or vacuole-initiating particles.

For the purposes of the present invention, pigments are incompatible particles which essentially do not result in vacuole formation when the film is stretched. The colouring action of the pigments is caused by the particles themselves. "Pigments" generally have a mean particle diameter of from 0.01 to a maximum of 1 µm, preferably from 0.01 to 0.7 µm, in particular from 0.01 to 0.4 µm. Pigments include both so-called "white pigments", which colour the films white, and "coloured pigments", which give the film a coloured or black colour. Conventional pigments are materials such as, for example, aluminium oxide, aluminium sulphate, barium sulphate, calcium carbonate, magnesium carbonate, silicates, such as aluminium silicate (kaolin clay) and magnesium silicate (talc), silicon dioxide and titanium dioxide, of which preference is given to the use of white pigments, such as calcium carbonate, silicon dioxide, titanium dioxide and barium sulphate.

The titanium dioxide particles generally consist of at least 95% by weight of rutile and are preferably employed with a coating of inorganic oxides and/or of organic compounds containing polar and nonpolar groups. $TiO_2$ coatings of this type are known in the prior art.

For the purposes of the present invention, "vacuole-initiating fillers" are solid particles which are incompatible with the polymer matrix and result in the formation of vacuole-like cavities when the films are stretched, with the size, nature and number of the vacuoles being dependent on the size and amount of the solid particles and the stretching conditions, such as stretching ratio and stretching temperature. The vacuoles reduce the density and give the films a characteristic pearl-like opaque appearance caused by light scattering at the "vacuole/polymer matrix" interfaces. Light scattering at the solid particles themselves generally contributes relatively little to the opacity of the film. In general, the vacuole-initiating fillers have a minimum size of 1 µm in order to give an effective, i.e. opacifying, amount of vacuoles. In general, the mean particle diameter of the particles is from 1 to 6 µm, preferably from 1.5 to 5 µm. The chemical character of the particles plays a secondary role, unless incompatibility exists.

Conventional vacuole-initiating fillers are inorganic and/or organic, polypropylene-incompatible materials, such as aluminium oxide, aluminium sulphate, barium sulphate, calcium carbonate, magnesium carbonate, silicates, such as aluminium silicate (kaolin clay) and magnesium silicate (talc), and silicon dioxide, amongst which calcium carbonate and silicon dioxide are preferably employed. Suitable organic fillers are the conventional polymers which are incompatible with the polymer of the base layer, in particular those such as HDPE, copolymers of cyclic olefins, such as norbornene or tetracyclododecene with ethylene or propene, polyesters, polystyrenes, polyamides and halogenated organic polymers, preference being given to polyesters, such as, for example, polybutylene terephthalates. For the purposes of the present invention, "incompatible materials or incompatible polymers" means that the material or polymer is in the film in the form of a separate particle or separate phase.

The opaque base layer comprises pigments in an amount of from 0.5 to 10% by weight, preferably from 1 to 8% by weight, in particular from 1 to 5% by weight. Vacuole-initiating fillers are present in an amount of from 0.5 to 30% by weight, preferably from 1 to 15% by weight, in particular from 1 to 10% by weight. The data are based on the weight of the base layer.

The density of the film can vary, depending on the composition of the base layer, in a range from 0.4 to 1.1 g/cm³. Vacuoles contribute to a reduction in the density, whereas pigments, such as, for example, $TiO_2$, increases the density of the film owing to its relatively high specific weight. The density of the film is preferably from 0.5 to 0.95 g/cm³.

In addition, the base layer can, both in a transparent and in an opaque embodiment, comprise conventional additives, such as neutralisers, stabilisers, antistatics and/or lubricants, in effective amounts in each case. The following data in % by weight are in each case based on the weight of the base layer.

Preferred antistatics are glycerol monostearates, alkali metal alkane-sulphonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having from 10 to 20 carbon atoms which are substituted by ω-hydroxy-($C_1$–$C_4$) alkyl groups, where N,N-bis(2-hydroxyethyl)alkylamines having from 10 to 20 carbon atoms, preferably from 12 to 18 carbon atoms, in the alkyl radical are particularly suitable. The effective amount of antistatic is in the range from 0.05 to 0.5% by weight.

Lubricants are higher aliphatic acid amides, higher aliphatic acid esters, waxes and metal soaps as well as polydimethylsiloxanes. The effective amount of lubricant is in the range from 0.01 to 3% by weight, preferably from 0.02 to 1% by weight. Particularly suitable is the addition of higher aliphatic acid amides in the range from 0.01 to 0.25% by weight in the base layer. Particularly suitable aliphatic acid amides are erucamide and stearylamide. The addition of polydimethylsiloxanes is preferred in the range from 0.02 to 2.0% by weight, in particular polydimethylsiloxanes having a viscosity of from 5000 to 1,000,000 mm²/s.

Stabilisers which can be employed are the conventional stabilising compounds for polymers of ethylene, propylene and other α-olefins. They are added in an amount of between 0.05 and 2% by weight. Particularly suitable are phenolic and phosphitic stabilisers, such as tris 2,6-dimethylphenyl phosphite. Phenolic stabilisers having a molecular weight of greater than 500 g/mol are preferred, in particular tris-2,6-dimethylphenyl phosphite, pentaerythrityl tetrakis-3-(3,5-di-tertiary-butyl-4-hydroxyphenyl)propionate or 1,3,5-trimethyl-2,4,6-tris(3,5-di-tertiary-butyl-4-hydroxybenzyl) benzene. Phenolic stabilisers are employed here alone in an amount of from 0.1 to 0.6% by weight, in particular from 0.1 to 0.3% by weight, phenolic and phosphitic stabilisers in the ratio from 1:4 to 2:1 and in a total amount of from 0.1 to 0.4% by weight, in particular from 0.1 to 0.25% by weight.

Neutralisers are preferably dihydrotalcite, calcium stearate and/or calcium carbonate having a mean particle size of at most 0.7 µm, an absolute particle size of less than 10 µm and a specific surface area of at least 40 m²/g. In general, from 0.02 to 0.1% by weight is added.

For two-layered embodiments, which have only one inner top layer, it is preferred that the outer surface of the base layer is surface-treated by means of corona, plasma or flame.

The polyolefin film according to the invention preferably has a second, outer top layer which exhibits good adhesion to conventional printing inks, adhesives, and coatings and/or lacquers. This outer top layer of the film is preferably applied to the opposite surface of the base layer and is referred to below as "outer top layer". In order further to improve the adhesion of printing inks, adhesives and coatings, it is preferred to carry out a corona, plasma or flame treatment of the surface of the outer top layer.

The outer top layer is generally built up from polymers of olefins having from 2 to 10 carbon atoms. The outer top layer generally comprises from 95 to 100% by weight of polyolefin, preferably from 98 to <100% by weight of polyolefin, in each case based on the weight of the top layer(s).

Examples of suitable olefinic polymers of the top layer(s) are propylene homopolymers, copolymers or terpolymers II comprising ethylene, propylene and/or butylene units or mixtures of the said polymers. These copolymers or terpolymers II contain no carboxylic acid monomers (or esters thereof). They are polyolefins. Of these, preferred polymers are random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, or random ethylene-propylene-1-butylene terpolymers having an ethylene content of from 1 to 10% by weight and a 1-butylene content of from 2 to 20% by weight, or a mixture or blend of ethylene-propylene-1-butylene terpolymers and propylene-1-butylene copolymers having an ethylene content of from 0.1 to 7% by weight and a propylene content of from 50 to 90% by weight and a 1-butylene content of from 10 to 40% by weight. The data in % by weight are in each case based on the weight of the polymer.

The above-described copolymers and/or terpolymers II employed in the outer top layer generally have a melt flow index of from 1.5 to 30 g/10 min, preferably from 3 to 15 g/10 min. The melting point is in the range from 120 to 145° C. The above-described blend of copolymers and terpolymers II has a melt flow index of from 5 to 9 g/10 min and a melting point of from 120 to 150° C. All the melt flow indices indicated above are measured at 230° C. and a force of 21.6 N (DIN 53 735). If desired, all the top-layer polymers described above can have been peroxidically or also thermooxidatively degraded, with the degradation factor generally being in a range from 1 to 15, preferably from 1 to 8.

If desired, the above-described additives, such as antistatics, neutralisers, lubricants and/or stabilisers, and, if desired, additionally antiblocking agents can be added to the outer top layer(s). The data in % by weight are then based correspondingly on the weight of the top layer.

Suitable antiblocking agents have already been described in connection with the inner top layer. These antiblocking agents are also suitable for the outer top layer. The preferred amount of antiblocking agent for the outer top layer is in the range from 0.1 to 2% by weight, preferably from 0.1 to 0.8% by weight.

The thickness of the outer top layer is generally greater than 0.1 µm and is preferably in the range from 0.1 to 5 µm, in particular from 0.3 to 2 µm.

In a particularly preferred embodiment, the surface of the outer top layer is corona-, plasma- or flame-treated. This treatment serves to prepare the film surface for subsequent decoration and printing, i.e. to ensure wettability with and adhesion of printing inks and other decoration agents.

The film according to the invention comprises at least the base layer described above and the inner top layer, comprising copolymer or terpolymer I and additive. If desired, a second, outer top layer is applied to the opposite surface. If desired, an interlayer or interlayers may also be present on one or both sides between the base layer and the top layer(s).

The interlayer(s) can be built up from the olefinic polymers, preferably propylene polymers, described for the base layer or for the top layers. The interlayer(s) can comprise the conventional additives described for the individual layers, such as antistatics, neutralisers, lubricants and/or stabilisers. In a further embodiment, an additive as described above for the inner top layer can likewise be added to the interlayer arranged between the base layer and the inner top layer. Preferred additives are likewise the polyolefins, polystyrene, polyesters, polyamides, hydrocarbon and wax described. The content of additive in the interlayer is at most 30% by weight and is preferably in the range from 0.5 to 20% by weight, in each case based on the weight of the interlayer. The thickness of this interlayer is greater than 0.5 µm and is preferably in the range from 0.6 to 6 µm, in particular from 1 to 4 µm.

Of the possible suitable additives, higher aliphatic acid amides higher aliphatic acid esters, such as, for example, erucamide and/or polysiloxane, such as polydimethylsiloxanes, are particularly suitable, where these additives are employed in conventional or even slightly increased amounts. For example, up to 5% by weight of EA or PDMS can be incorporated into the interlayer.

If desired, the interlayer may additionally comprise the antiblocking agents described for the top layers in order additionally to contribute towards the surface roughness.

The interlayer, which, in a preferred embodiment, can be applied between the outer top layer and the base layer (outer interlayer below), contributes to high gloss on the outside of the opaque label, in particular unfilled (i.e. without vacuole-initiating fillers and without $TiCl_2$) outer interlayers of propylene homopolymer. For embodiments in which a white or opaque appearance (high hiding power) of the label is desired, the outer interlayer comprises vacuole-initiating fillers and/or pigments, in particular $TiO_2$. The thickness of this outer interlayer is greater than 0.3 µm and is preferably in the range from 1.0 to 15 µm, in particular from 1.5 to 10 µm.

The total thickness of the label film according to the invention can vary within broad limits and depends on the intended use. It is preferably from 15 to 150 µm, in particular from 20 to 100 µm, preferably from 25 to 90 µm. The base layer makes up from about 40 to 99% of the total film thickness.

The invention furthermore relates to a process for the production of the polyolefin film according to the invention by the coextrusion process, which is known per se. This process is carried out by coextruding the melts corresponding to the individual layers of the film simultaneously and jointly through a flat-film die, taking off the resultant film over one or more roll(s) for solidification, subsequently stretching (orienting) the multilayered film, heat-setting the stretched film and, if desired, plasma- corona- or flame-treating the surface layer intended for the treatment.

Biaxial stretching (orientation) is carried out sequentially or simultaneously. The sequential stretching is generally carried out consecutively, with consecutive biaxial stretching, in which stretching is firstly carried out longitudinally (in the machine direction) and then transversely (perpendicular to the machine direction), being preferred. The film production is described further using the example of flat film extrusion with subsequent sequential stretching.

Firstly, as is usual in the extrusion process, the polymer or polymer mixture of the individual layers is compressed and liquefied in an extruder, it being possible for any additives added already to be present in the polymer or polymer mixture. The melts are then forced simultaneously through a flat-film die (slot die), and the extruded multilayered film is taken off over one or more take-off rolls at a temperature of from 10 to 100° C., preferably from 10 to 50° C., during which it cools and solidifies.

The film obtained in this way is then stretched longitudinally and transversely to the extrusion direction, which results in orientation of the molecule chains. The longitudinal stretching is preferably carried out at a temperature of from 70 to 130° C., preferably from 80 to 110° C., advantageously with the aid of two rolls running at different speeds corresponding to the target stretching ratio, and the transverse stretching is preferably carried out at a temperature of from 120 to 180° C. with the aid of an appropriate tenter frame. The longitudinal stretching ratios are in the range from 3 to 8, preferably from 4 to 6. The transverse stretching ratios are in the range from 5 to 10, preferably from 7 to 9.

In principle, it is necessary for the longitudinal stretching of a film by means of rolls to warm the film to a minimum temperature through the roll contact in order that uniform stretching is possible. In connection with the present invention, it has been found that the top layer comprising copolymers or terpolymers I have an increased tendency to stick to the rolls of the longitudinal stretching unit. It has been found that a film whose top layer consists only of copolymers or terpolymers I cannot be stretched in the longitudinal direction by means of rolls using the conventional stenter process. If the temperatures are too high, deposits on the longitudinal stretching rolls result in optical defects. At lower temperatures, stretch arcs and tears occur. It has not been possible to find a suitable temperature range in which the film can be produced on a production scale.

Surprisingly, the additives described in the top layer significantly reduce the tendency of the top-layer raw material to stick and deposits on the longitudinal stretching rolls. It has thus been possible to find a temperature range which allows the production of the film on a production scale. It has been found that the addition of the waxes, polyethylenes or other additives makes possible longitudinal stretching at a temperature in the region of the melting point of the particular top-layer raw material. Preference is given to a temperature in the region of 10° C., preferably 5° C., above or below the melting point of the copolymer or terpolymer I.

The stretching of the film is followed by heat-setting (heat treatment) thereof, in which the film is held at a temperature from 100 to 160° C. for from about 0.1 to 10 seconds. The film is subsequently wound up in a conventional manner by means of a wind-up device.

After the biaxial stretching, one or both surface(s) of the film is (are) preferably plasma-, corona- or flame-treated by one of the known methods. The treatment intensity is generally in the range from 35 to 50 mN/m, preferably from 37 to 45 mN/m.

In the case of corona treatment, an advantageous procedure is to pass the film between two conductor elements serving as electrodes, with such a high voltage, usually an alternating voltage (from about 5 to 20 kV and from 5 to 30 kHz), being applied between the electrodes that spray or corona discharges are able to occur. Due to the spray or corona discharge, the air above the film surface is ionised and reacts with the molecules of the film surface, causing the formation of polar inclusions in the essentially non-polar polymer matrix.

The surface treatment, such as, for example, corona treatment, can be carried out immediately during production of the label film or at a later point in time, for example immediately before the labelling operation.

In accordance with the invention, the label film is employed in various methods for the labelling of plastic containers, in particular for the in-mould and thermolabelling method, it being unnecessary here for adhesives or adhesion promoters, coatings or similar auxiliaries to be applied in a separate working step after the film production.

Furthermore, it has been found that the labels also adhere very well to other materials, such as, for example, glass, aluminium, wood or tinplate, with labelling by means of thermolabelling being suitable in the case of these materials.

The thermoplastic polymer containers to be labelled can be or have been produced by a very wide variety of processes and from a very wide variety of materials. The containers can have either solid walls or foamed walls. The latter can be foamed in the mould from granular precursors containing corresponding blowing agents or shaped from foamed sheets by thermoforming. Depending on the requirements of the container and the process for the production thereof, various materials, such as polypropylene (PP), high- or low-density polyethylene (HD-PE or LD-PE or LLD-PE), polystyrene (PS), polyvinyl chloride (PVC), polyethylene terephthalate (PET), copolymers thereof and other polymers, in individual cases also mixtures of such polymers, are thus employed for the production of the containers. Processes for the production of the containers are, for example, injection moulding, thin-wall injection moulding, blow moulding, thermoforming or injection stretch blow moulding.

The labelling of the thermoplastic polymer containers with the label film according to the invention can be carried out by the IML method and combined with all the standard processes mentioned for the production of containers. A feature that is common to all variants or combinations is that the label is cut to size before the shaping or production of the container (cut-in-place or cut & stack) and laid in the mould in such a way that the printed outside of the label is in contact with the mould and later forms the visible side of the container. The inside of the label faces the container. During the shaping or production of the container, the inner surface of the label bonds to the container under the action of pressure and temperature.

The temperatures and pressures to be used during the shaping or production of the thermoplastic polymer container depend on the properties of the moulding compositions employed and on the requirements of the selected process for the production or shaping of the container. These conditions are outlined in various handbooks of plastics processing (inter alia "Kunststoff-Taschenbuch", edited by Hj. Saechtling, Hanser-Verlag Munich-Vienna) and in the recommendations of the manufacturers of the corresponding moulding compositions.

The label film can also be employed in accordance with the invention for the labelling of containers by the thermolabelling method. For the purposes of the present invention, thermolabelling is a labelling method in which the label is applied under the action of heat (without additional auxiliaries) to a container which has been produced in advance, i.e. in a separate working step. A surprisingly large number of container materials can be labelled, for example glass, metal, such as, for example, tinplate or aluminium, or also thermoplastic polymers, which have been described above for the in-mould label method.

It is not necessary in accordance with the invention for the label additionally to be provided with coupling agents and auxiliaries, adhesives or coatings on the inside. All that is needed is the action of heat and, if necessary, additionally pressure in order to apply the label with its inner top layer to the surface of the container wall. Either the label and/or the pre-shaped container can be heated to a suitable temperature range in a separate process step, after production of the container, but before application of the label, where the container should remain as dimensionally stable as possible at these temperatures. The suitable temperature range depends on the material of the container and is, for example, from 90 to 140° C. for PP, from 70 to 120° C. for PE-HD, from 60 to 115° C. for PE-LD and PE-LLD, from 130 to 170° C. for PET, from 110 to 145° C. for PC, from 70 to 130° C. for rigid PVC, from 50 to 120° C. for flexible PVC, depending on the formulation, and from 70 to 95° C. for PS. During labelling with the label film according to the invention, a temperature range of from 95 to 130° C. is preferably maintained for PP, from 75 to 115° C. for PE-HD, from 65 to 105° C. for PE-LD and PE-LLD, from 135 to 165° C. for PET, from 120 to 140° C. for PC, from 80 to 125° C. for rigid PVC, from 60 to 120° C. for flexible PVC, depending on the formulation, and from 75 to 90° C. for PS.

The additional use of a suitable contact pressure together with the action of heat may be helpful. The pressure here can act over the entire area of the label by, for example, corresponding "heat-sealing tools" or rams pressing the label flat onto the container. The prerequisite for this is a flat container shape in the region of the label to be applied. Rolls or brushes may, if desired, be passed over the label and thus press the label on over its entire area. This is particularly advantageous in the case of round container shapes. The contact pressure can vary within broad limits and is dependent on the method and the container shape.

In particular in the case of containers having thin and flat walls, preferred method variants are those in which the container wall is stabilised by a corresponding counterpressure. In the case of pots and dishes, female moulds or counter pressure rolls lying against the inner wall and also an excess pressure of air, particularly in the case of bottles, are suitable for this purpose.

If desired, the label can also only be bonded to the container wall on a part area (patch labelling). In this variant, an adhesive is applied to the label over the entire area in accordance with the prior art, and the label is subsequently applied to the container wall. In the case of the label film according to the invention, the application of adhesive is unnecessary. One or more labels can be applied to a container in this way.

A further variant of subsequent container labelling is wrap-around labelling, in which the label in the form of a strip is wrapped around the container and only bonded to the container wall or to the label itself at the ends of the strip by application of a hot-melt adhesive, which provides adhesion of the label to the container or of the label to itself. In the case of the film according to the invention, the application of adhesive is unnecessary. All that is needed is warming in the region of the strip, which adheres to the container or to the film.

Depending on the method variant selected, it may be advantageous also or only to heat the label film before application. In these cases, the preferred temperature range of the inner film surface is from 70 to 130° C., particularly preferably from 80 to 125° C. Surprisingly, only very low temperatures are necessary in order to produce good adhesion of the label by means of thermolabelling.

Depending on the printing method used, the process for the production of the containers and the machinery at the site of label application, the labels can be delivered by the "cut-in-place" or by the "cut & stack" method.

In a further application, the label film may also be employed as a constituent of a laminate, which can itself be used in the manner described as in-mould or thermolabelling label. The label films according to the invention then forms the inside of the laminate, so that, in accordance with the invention, the inner surface of the label film faces the container in the same way and ensures good adhesion to the container. More or less thin, transparent films, in particular transparent BOPP films, are typically used on the outside of the label. The print motif here is located between the inner and outer films. The two films are bonded to one another by means of a suitable adhesive.

Measurement Methods

The raw materials and films were characterized using the following measurement methods:

Melt Flow Index

The melt flow index was measured in accordance with DIN 53 735 at a load of 21.6 N and at 230° C.

Melting Point

DSC measurement, maximum of the melting curve, heating rate 20° C./min.

Haze

The haze of the film was measured in accordance with ASTM-D 1003-52.

Gloss

The gloss was determined in accordance with DIN 67 530. The reflector value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Surface Tension

The surface tension was determined by the so-called ink method (DIN 53 364).

Printability

The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as moderate, and if a significant amount of ink was removed, it was assessed as poor.

Roughness Measurement

As a measure of the roughness of the insides of the films, the roughness values Rz of the films were measured in accordance with DIN 4768 Part 1 and DIN 4777, as well as DIN 4772 and 4774 by means of an S8P perthometer from Feinprüf Perthen GmbH, Göttingen, by the profile method. The measurement head, a single-skid probe system in accordance with DIN 4772, was fitted with a probe tip having a radius of 5 µm and an cone angle of 90° with a probe force of from 0.8 to 1.12 mN and a skid having a radius of 25 mm in the sliding direction. The vertical measurement range was set to 62.5 µm, the probe zone to 5.6 mm and the cut-off of the RC filter in accordance with DIN 4768/1 to 0.25 mm.

Production of the Films

EXAMPLE 1

A transparent three-layered film consisting of the base layer B, an inner top layer A and an outer top layer C and having a total thickness of 60 µm was produced by coextrusion and subsequent stepwise orientation in the longitudinal and transverse directions. The top layer A had a thickness of 2.0 µm and the top layer C had a thickness of 0.7 µm. The layers had the following compositions:

Base layer B:

| | |
|---|---|
| 99.64% by weight | of propylene homopolymer having a melting point of 165° C. and a melt flow index of 3.4 g/10 min and a chain isotacticity index of 94% |
| 0.10% by weight | of erucamide (lubricant) |
| 0.10% by weight | of Armostat 300 (antistatic) |
| 0.03% by weight | of neutraliser (CaCO3) |
| 0.13% by weight | of stabiliser (Irganox) |

Top layer A:

| | |
|---|---|
| 94.5% by weight | of terpolymer of ethylene, ethyl acrylate and maleic anhydride having an ethylene content of 91% by weight an ethyl acrylate content of 5% by weight and a |

-continued

|  |  |
|---|---|
|  | maleic anhydride content of 4% by weight, based on the terpolymer. The melt flow index was 5.0 g/10 min [at 190° C., 21.6 N] |
| 0.5% by weight | of SiO2 as antiblocking agent having a mean particle size of 4 μm |
| 5.0% by weight | of polyethylene wax having a molecular weight Mn (number average) of 2000 |

Top layer C:

|  |  |
|---|---|
| 99.54% by weight | of random copolymer of ethylene and propylene having a melt flow index of 6.0 g/10 min and an ethylene content of 6% by weight, based on the copolymer |
| 0.22% by weight | of SiO2 as antiblocking agent having a mean particle size of 4 μm |
| 0.20% by weight | of stabiliser (Irganox 1010/Irgafos 168) |
| 0.04% by weight | of neutraliser (Ca stearate) |

The production conditions in the individual process steps were as follows:

| Extrusion: | Temperatures | Base layer B: | 260° C. |
|---|---|---|---|
|  |  | Top layer A: | 230° C. |
|  |  | Top layer C: | 240° C. |
|  | Temperature of the take-off roll: |  | 20° C. |
| Longitudinal stretching: | Temperature: |  | 100° C. |
|  | Longitudinal stretching ratio: |  | 1:4.5 |
| Transverse stretching: | Temperature: |  | 165° C. |
|  | Transverse stretching ratio: |  | 1:9 |
| Setting: | Temperature: |  | 140° C. |
|  | Convergence: |  | 10% |
| Pressure pretreatment | Top layer A |  | Corona 10,000 V/10,000 Hz |
|  | Top layer C |  | Corona 10,000 V/10,000 Hz |

The transverse stretching ratio of 1:9 is an effective value. This effective value is calculated from the final film width B reduced by twice the hem width b divided by the width of the longitudinally stretched film C, likewise reduced by twice the hem width b.

EXAMPLE 2

A three-layered film as described in Example 1 was produced. In contrast to Example 1, 5.1% by weight of calcium carbonate (chalk) having a mean particle diameter of 2 μm were additionally incorporated into the base layer as vacuole-initiating particles (chalk). The polypropylene content was reduced correspondingly. The production conditions in the individual process steps were as in Example 1. The film was opaque. In addition, the composition of the top layer A was modified as follows:

| Top layer A: | |
|---|---|
| 92.5% by weight | of terpolymer of ethylene, ethyl acrylate and maleic anhydride having an ethylene content of 91% by weight ethyl acrylate content of 5% by weight and a maleic anhydride content of 4% by weight, based on the terpolymer. The melt flow index was 5.0 g/10 min [at 190° C., 21.6 N] |
| 0.5% by weight | of SiO2 as antiblocking agent having a mean particle size of 4 μm |

-continued

| Top layer A: | |
|---|---|
| 2.0% by weight | of polyethylene wax having a molecular weight Mn (number average) of 2000 |
| 5.0% by weight | of HDPE having an MFI of 15 g/10 min (190° C./2.16 kg) and a melting point of 133° C. (DSC@10° C./min) |

In addition to the labelling applications described below, the film was used as lid film and applied to yoghurt pots made from polystyrene and to a casting part made from polypropylene. The film exhibited good adhesion to both the containers and could subsequently be removed easily and without leaving a residue. The good adhesion was achieved at temperatures of only about 80° C. The heat-sealing rim of the yoghurt pot thus remained reliably dimensionally stable.

EXAMPLE 3

A three-layered film as described in Example 2 was produced. In contrast to Example 2, 2.8% by weight of titanium dioxide (rutile) were additionally incorporated into the base layer as pigment. The polypropylene content was reduced correspondingly. The production conditions in the individual process steps were as in Example 2. The film was white opaque. In addition, the composition of the top layer A was modified as follows:

| Top layer A: | |
|---|---|
| 89.5% by weight | of terpolymer of ethylene, ethyl acrylate and maleic anhydride having an ethylene content of 91% by weight ethyl acrylate content of 5% by weight and a maleic anhydride content of 4% by weight, based on the terpolymer. The melt flow index was 5.0 g/10 min [at 190° C., 21.6 N] |
| 0.5% by weight | of SiO2 as antiblocking agent having a mean particle size of 4 μm |
| 10.0% by weight | of HDPE having an MFI of 15 g/10 min (190° C./2.16 kg) and a melting point of 133° C. (DSC@10° C./min) |

EXAMPLE 4

A film as described in Example 3, but with an additional interlayer, was produced. The interlayer D was applied between the base layer B and the top layer C and was built up from pure propylene homopolymer having a melting point of 165° C. and a melt flow index of 3.4 g/10 min and a chain isotacticity index of 94%. The production conditions in the individual process steps were as in Example 3. In addition, the composition of the top layer A was modified as follows:

| Top layer A: | |
|---|---|
| 89.5% by weight | of terpolymer of ethylene, ethyl acrylate and maleic anhydride having an ethylene content of 91% by weight ethyl acrylate content of 5% by weight and a maleic anhydride content of 4% by weight, based on the terpolymer. The melt flow index was 5.0 g/10 min [at 190° C., 21.6 N] |
| 0.5% by weight | of SiO2 as antiblocking agent having a mean particle size of 4 μm |

-continued

| Top layer A: | |
|---|---|
| 10.0% by weight | of random copolymer of ethylene and propylene having a melt flow index of 6.0 g/10 min and an ethylene content of 6% by weight, based on the copolymer |

EXAMPLE 5

A film as described in Example 4, but with a second interlayer E on the opposite side, was produced. In addition, the composition of the top layer A was modified as follows:

| Top layer A: | |
|---|---|
| 87.5% by weight | of terpolymer of ethylene, ethyl acrylate and maleic anhydride having an ethylene content of 91% by weight ethyl acrylate content of 5% by weight and a maleic anhydride content of 4% by weight, based on the terpolymer. The melt flow index was 5.0 g/10 min [at 190° C., 21.6 N] |
| 0.5% by weight | of SiO2 as antiblocking agent having a mean particle size of 4 µm |
| 2.0% by weight | of polyethylene wax having a molecular weight Mn (number average) of 2000 |
| 10.0% by weight | of random copolymer of ethylene and propylene having a melt flow index of 6.0 g/10 min and an ethylene content of 6% by weight, based on the copolymer |

The interlayers D and E had the following compositions:

| First interlayer D: | |
|---|---|
| 90.58% by weight | of propylene homopolymer having a melting point of 165° C. and a melt flow index of 3.4 g/10 min and a chain isotacticity index of 94% |
| 9.0% by weight | of titanium dioxide (rutile) as pigment |
| 0.12% by weight | of erucamide |
| 0.14% by weight | of Armostat 300 |
| 0.03% by weight | of neutraliser (CaCO3) |
| 0.13% by weight | of stabiliser (Irganox) |
| Second interlayer E: | |
| 97.58% by weight | of random copolymer of ethylene and propylene having a melt flow index of 6.0 g/10 min and an ethylene content of 6% by weight, based on the copolymer |
| 2.0% by weight | of polydimethylsiloxane (PDMS) having a viscosity of 30,000 mm²/s |
| 0.18% by weight | of erucamide |
| 0.20% by weight | of stabiliser (Irganox 1010/Irgafos 168) |
| 0.04% by weight | of neutraliser (Ca stearate) |

The production conditions in the individual process steps were as in Example 2.

COMPARATIVE EXAMPLE 1

A transparent three-layered film as described in Example 1 was produced. In contrast to Example 1, the terpolymer of ethylene, ethyl acrylate and maleic anhydride in the inner top layer A was replaced by a random copolymer of ethylene and propylene having a melt flow index of 6.0 g/10 min and an ethylene content of 6% by weight, based on the copolymer. The production conditions in the individual process steps were as in Example 1.

COMPARATIVE EXAMPLE 2

An opaque three-layered film as described in Example 2 was produced. In contrast to Example 2, the terpolymer of ethylene, ethyl acrylate and maleic anhydride in the inner top layer A was replaced by a random copolymer of ethylene and propylene having a melt flow index of 6.0 g/10 min and an ethylene content of 6% by weight, based on the copolymer. The production conditions in the individual process steps were as in Example 2.

COMPARATIVE EXAMPLE 3

A three-layered white opaque film as described in Example 3 was produced. In contrast to Example 3, the HDPE content of the inner top layer A was increased to 50% by weight. The production conditions in the individual process steps were as in Example 3.

COMPARATIVE EXAMPLE 4

A four-layered white opaque film as described in Example 4 was produced. In contrast to Example 3, the copolymer content of the inner top layer A was increased to 50% by weight. The production conditions in the individual process steps were as in Example 4.

COMPARATIVE EXAMPLE 5

A five-layered white opaque film as described in Example 5 was produced. In contrast to Example 3, the copolymer content of the inner top layer A was increased to 25% by weight. The production conditions in the individual process steps were as in Example 5.

COMPARATIVE EXAMPLE 6

It was attempted to produce a three-layered, white opaque film as described in Example 1. In contrast to Example 1, no polyethylene wax or Sylobloc were added. The production conditions in the individual process steps were as in Example 1. Owing to massive deposits on the longitudinal stretching rolls, it was not possible to produce a film.

The films of the examples and comparative examples were employed in in-mould and thermolabelling methods and compared with respect to their adhesion properties. For the in-mould test series, various container materials were injected into a container mould at the respective usual processing temperatures for the polymer. Before the actual injection operation, a film in accordance with the examples and comparative examples was laid in the container mould in such a way that the inside of the film was facing the container to be shaped. After production of the labelled container, the adhesive strength of the respective label was tested. The results are shown in Table 1.

For the thermolabelling test series, containers made from various polymers were employed. In individual cases, such as, for example, in the case of glass containers, the container was pre-warmed slightly (about 50–60° C.). A corresponding film piece was ironed onto the respective container under the action of a manual contact pressure at a temperature of from 120 to 130° C. by means of a hand heat-sealing piston. After the container labelled way had cooled to room temperature, the adhesive strengths were gated. The results are shown in Table 2.

TABLE 1

| | IML | | | | | |
|---|---|---|---|---|---|---|
| Example | PP | PE | PET/PETE | PS | PVC | PC |
| 1 | +++ | +++ | +++ | +++ | +++ | +++ |
| 2 | +++ | +++ | +++ | +++ | +++ | +++ |
| 3 | +++ | +++ | +++ | +++ | +++ | +++ |
| 4 | +++ | +++ | ++ | ++ | ++ | ++ |
| 5 | +++ | +++ | +++ | ++ | ++ | ++ |
| C1 | +++ | + | – | – | – | – |
| C2 | +++ | + | – | – | – | – |
| C3 | +++ | +++ | – | – | – | – |
| C4 | +++ | ++ | – | – | – | – |
| C5 | +++ | ++ | + | – | – | – |

TABLE 2

| | Thermolabelling | | | | | | | |
|---|---|---|---|---|---|---|---|---|
| Example | PP | PE | PET/PETE | PS | PVC | PC | Glass | Tinplate/aluminium |
| 1 | +++ | +++ | +++ | +++ | +++ | +++ | +++ | +++ |
| 2 | +++ | +++ | +++ | +++ | +++ | +++ | +++ | +++ |
| 3 | +++ | +++ | +++ | +++ | +++ | +++ | +++ | +++ |
| 4 | +++ | ++ | ++ | ++ | ++ | ++ | +++ | +++ |
| 5 | +++ | ++ | ++ | ++ | ++ | ++ | +++ | +++ |
| C1 | +++ | + | – | – | – | – | – | – |
| C2 | +++ | + | – | – | – | – | – | – |
| C3 | +++ | ++ | – | – | – | – | + | + |
| C4 | +++ | ++ | – | – | – | – | – | + |
| C5 | +++ | ++ | + | – | – | – | ++ | ++ |

Assessment criteria:
+++ very good adhesion > 1.5 N/15 mm
++ good adhesion >> 0.5 N/15 mm
+ very weak adhesion ≧ 0.5 N/15 mm
– no adhesion at all

The invention claimed is:

1. Method of making a label film, which method comprises converting a biaxially oriented multilayered coextruded polyolefin film comprising (i) a base layer comprising polypropylene and (ii) at least one adhesion-promoting layer, wherein this adhesion-promoting layer comprises at least about 70% by weight of a copolymer (I) or terpolymer (I) built up from at least an olefin and an unsaturated carboxylic acid, and
    (b) from 1 to 30% by weight of a deposit preventing additive consisting of one or more of wax, polystyrene, polyester, polyamide and high density polyethylene, wherein the % by weight are in each case based on the weight of the adhesion-promoting layer, into a label film.

2. Method of making a label film, which method comprises converting a biaxially oriented multilayered coextruted polyolefin film comprising a base layer and at least one adhesion-promoting layer into a label film, said adhesion-promoting layer comprising (a) at least about 70% by weight of a copolymer (I) or terpolymer (I) built up from at least an olefin and an unsaturated carboxylic acid or ester thereof or an anhydride thereof and (b) not more than 30% by weight of a deposit preventing additive, wherein the % by weight are in each case based on the weight of the adhesion-promoting layer, wherein said label film exhibits an adhesive strength of greater than 1.0 N/15 mm to one or more of a PP container, a PE container, a PVC container, a PS container or a PET container and said copolymer or terpolymer is present within the adhesion-promoting layer alone.

3. Process for the production of a polyolefin film by the coextrusion process, in which the melts corresponding to the individual layers of the film are coextruded simultaneously and jointly through a flat-film die, the resultant film is taken off over one or more roll(s) for solidification, the multilayered film is subsequently stretched, the stretched film is heat-set, wherein the film has a adhesion-promoting layer which comprises
    (a) at least about 70% by weight of a terpolymer present within the adhesion-promoting layer alone, said terpolymer built up from (i) olefin (ii) an unsaturated carboxylic acid or ester thereof or an anhydride thereof selected from acrylic acid or methacrylic acid and (iii) an unsaturated monocarboxylic acid ester or an unsaturated dicarboxylle acid or anhydride thereof selected from glycidyl methacrylate, maleic acid or maleic anhydride, and
    (b) not more than 30% by weight of a deposit preventing additive, wherein the % by weight are in each case based on the weight of the adhesion-promoting layer, and the longitudinal stretching of the film is carried out by means of heated rolls, and the temperature during the longitudinal stretching varies in a range from about 10° C. above or below the melting point of the copolymer or terpolymer.

4. Method of making a labeled wood, ceramic, glass or metal, which method comprises labeling a biaxially oriented multilayered coextruded polyolefin film comprising a base layer and at least one adhesion-promoting layer, wherein this adhesion-promoting layer comprises at least about 50% by weight of a copolymer (I) or terpolymer (I) present within said adhesion-promoting layer alone, said copolymer (I) or terpolymer (I) built up from at least an olefin and an unsaturated carboxylic acid or ester thereof or an anhydride thereof, and not more than 50% by weight of a deposit preventing additive, wherein the % by weight are in each case based on the weight of the adhesion-promoting layer, onto wood, ceramic, glass or metal by the thermolabelling method.

5. Method according to claim 4, wherein the metal is aluminum or tin.

6. Method of making a multilayered composite, which method comprises laminating a biaxially oriented multilayered coextruded polyolefin film comprising a base layer and at least one adhesion-promoting layer, wherein this adhesion-promoting layer comprises at least about 70% by weight of a copolymer (I) or terpolymer (I) present within said adhesion-promoting layer alone, said copolymer (I) or terpolymer (I) built up from at lout an olefin and an unsaturated carboxylic acid or ester thereof or an anhydride thereof, and not more than 30% by weight of a deposit preventing additive, wherein the % by weight are in each case based on the weight of the adhesion-promoting layer, against a further thermoplastic polymer film or against a paper, wood or metal substrate.

7. Method of making a lid, which method comprises converting a biaxially oriented multilayered coextruded polyolefin film comprising a base layer and at least one adhesion-promoting layer into a lid,
    wherein this adhesion-promoting layer comprises
    (a) at least about 70% by weight of a terpolymer (I) present within said adhesion-promoting layer alone, said terpolymer (I) built up from (i) olefin (ii) an unsaturated carboxylic acid or ester thereof or an anhydride thereof selected from acrylic acid or methacrylic acid and (iii) an unsaturated monocarboxylic acid ester or an unsaturated dicarboxylic acid or anhydride thereof selected from glycidyl methacrylate, maleic acid or maleic anhydride, and (b) not more then 30% by weight of a deposit preventing additive, wherein the % by weight are in each case based on the weight of the adhesion-promoting layer.

8. Method according to claim 7, wherein the lid is made from PS, PP, PE, PET, PVC, PC, metal or tinplate.

9. Method of making a label film, which method comprises converting a biaxially oriented multilayered coextruded polyolefin film comprising (i) a base layer and (ii) at least one adhesion-promoting layer, wherein this adhesion-promoting layer comprises (a) at least about 70% by weight of a terpolymer (I), said terpolymer present within said adhesion-promoting lever alone, said terpolymer built up from (i) olefin; (ii) an unsaturated carboxylic acid or ester thereof or an anhydride thereof selected from acrylic acid or methacrylic acid and (iii) an unsaturated monocarboxylic acid ester or an unsaturated dicarboxylic acid or anhydride thereof selected from glycidyl methacrylate, maleic acid or maleic anhydride, and (b) not more than 30% by weight of a deposit preventing additive, wherein the % by weight are in each case based on the weight of the adhesion-promoting layer, into a label film.

10. Method according to claim 9, wherein the additive is a wax.

11. Method according to claim 10, wherein the wax is a polyethylene wax or a macrocrystalline paraffin (paraffin wax) or a microcrystalline wax (microwax).

12. Method according to claim 10 or 11, wherein the wax has a mean molecular weight Mn (number average) Mn of from about 200 to about 5000.

13. Method according to claim 12, wherein Mn is from about 200 to about 1000.

14. Method according to claim 10 or 11, wherein the wax has a melting point of from about 70 to about 120° C.

15. Method according to claim 9 or 10, wherein the wax is a polyethylene wax having a weight average to number average ratio Mw/Mn of from about 1 to about 2, and wherein the wax is present in an amount of from about 0.5 to about 30% by weight, based on the weight of the layer.

16. Method according to claim 9, wherein the polyolefin film has on the side of the base layer opposite the adhesion-promoting layer, a second outer top layer built up from one or more of copolymers II and terpolymers II.

17. Method according to claim 16, wherein the surface of the outer top layer is corona-, plasma- or flame-treated.

18. Method according to claim 16, wherein the outer top layer comprises antiblocking agents.

19. Method according to claim 18, wherein the antiblocking agent is $SiO_2$.

20. Method according to claim 9 or 16, wherein one or more interlayer(s) of olefinic polymers is (are) on one or both sides between the base layer and the top layer(s).

21. Method according to claim 20, wherein the interlayer arranged below the adhesion-promoting layer comprises additives.

22. Method according to claim 21, wherein the additive is selected from one or more of waxes, hydrocarbon resin, polystyrene, polyester, polyamide and linear or branched polyethylene of low (LLDPE, LDPE), medium or high (HDPE) density.

23. Method according to claim 21, wherein the additive comprises one or more compounds selected from the group consisting of lubricants, antistatics and antiblocking agents.

24. Method according to claim 9, wherein the thickness of the film is from about 15 to about 150 μm.

25. Method according to claim 24, wherein the thickness of the film is from about 25 to about 90 μm.

26. Method according to claim 9 or 24, wherein the base layer makes up from about 40 to about 60% of the total thickness.

27. Method recording to claim 9, wherein the additive is a polyolefin, a hydrocarbon resin, polystyrene, polyester or polyamide.

28. Method according to claim 27, wherein the additive is a propylene copolymer or terpolymer, a linear and branched polyethylene of low (LLDPE, LDPE), medium or high (HDPE) density.

29. Method according to claim 9, wherein the adhesion-promoting layer comprises from about 70 to about 99.5% by weight of the terpolymer (I).

30. Method according to claim 9, wherein the terpolymer I comprises from (a) about 65 to about 96% by weight of olefin, and (b) about 3 to about 34% by weight of unsaturated carboxylic acids or esters thereof selected from acrylic acid or methacrylic acid, and (c) about 1 to about 10% by weight of an unsaturated mono- or dicarboxylic acid or an ester thereof or an anhydride thereof which is different from (b) selected from glycidyl methacrylate, maleic acid or maleic anhydride.

31. Method according to claim 30, wherein the olefin is ethylene.

32. Method according to claim 30, wherein the unsaturated carboxylic acids or esters thereof is acrylic acid or esters thereof.

33. Method according to claim 32, wherein the unsaturated carboxylic acid is a methyl, ethyl, n-propyl, i-propyl, n-butyl, i-butyl, sec-butyl or tert-butyl acrylate.

34. Method according to claim 30, wherein the unsaturated mono- or dicarboxylic acid or ester thereof or anhydride thereof which is different form (b) is maleic anhydride or glycidyl methacrylate.

35. Method according to claim 9, wherein the adhesion-promoting layer comprises antiblocking agents.

36. Method according to claim 35, wherein the adhesion-promoting layer comprises from about 1 to about 5% by weight antiblocking agents.

37. Method according to claim 9, wherein the adhesion-promoting layer comprises a lubricant.

38. Method according to claim 37, wherein the lubricant is selected from one or more of erucamide and polydimethylsiloxane.

39. Method according to claim 9, wherein the adhesion-promoting layer comprises a mixture of two or more deposit preventing additives.

40. Method according to claim 39, wherein the mixture comprises a wax in an amount of from about 1 to about 10% by weight and HDPE in an amount of from about 1 to about 20% by weight.

41. Method according to claim 9, wherein the adhesion-promoting layer is corona-, plasma- or flame-treated.

42. Method according to claim 9, wherein the base layer comprises from about 70 to about 99% by weight of a propylene polymer.

43. Method according to claim 42, wherein the propylene polymer is a propylene homopolymer.

44. Method according to claim 9, wherein the base layer is opaque and comprises vacuole-initiating fillers.

45. Method according to claim 44, wherein the base layer also comprises pigments.

46. Method according to claim 44, wherein the opaque base layer comprises one or mare of
   a) from about 0.5 to about 30% by weight of vacuole-initiating fillers and
   b) from about 1 to about 10% by weight of pigments.

47. Method according to claim 9, wherein the base layer comprises one or more of lubricants and an antistatic.

48. Method according to claim 47, wherein the antistatic is a tertiary aliphatic amine.

49. Method for the production of a labeled container,
   wherein a biaxially oriented multilayered coextruded polyolefin film comprising a base layer and at least one adhesion-promoting layer, said adhesion-promoting layer comprising
   (a) at least about 70% by weight of a terpolymer (I) present within said adhesion-promoting layer alone.
      said terpolymer built up from (i) olefin (ii) an unsaturated carboxylic acid or ester thereof or an anhydride thereof selected from acrylic acid or methacrylic acid and (iii) an unsaturated monocarboxylic acid ester or an unsaturated dicarboxylic acid or anhydride thereof selected from glycidyl methacrylate, maleic acid or maleic anhydride, and
   (b) not more than 30% by weight of a deposit preventing additive, wherein the % by weight are in each case based on the weight of adhesion-promoting layer
   is applied to a container by means of in-mould or thermolabelling methods, and the adhesion-promoting layer faces the container, and the opposite surface forms the visible side of the container.

50. Method according to claim 49, wherein no (i) adhesive, (ii) additional bonding layer or (iii) coating is applied to the surface of the adhesion-promoting layer of the polyolefin film after production of the polyolefin film and before labeling of the container.

51. Method according to claim 49, wherein the container is made from thermoplastic.

52. Method according to claim 51, wherein the thermoplastic is PP, PE, PS, PVC or PC.

53. Method according to claim 49, wherein the labeling method is thermolabeling, and the label is applied to a shaped container with its adhesion-promoting layer at a temperature of above about 50° C., wherein either one or both the container and the label are warned and the label is applied by means of pressure, rolls or brushes.

* * * * *

UNITED STATES PATENT AND TRADEMARK OFFICE
CERTIFICATE OF CORRECTION

PATENT NO. : 7,144,542 B2  Page 1 of 1
APPLICATION NO. : 10/433796
DATED : December 5, 2006
INVENTOR(S) : Holzer et al.

It is certified that error appears in the above-identified patent and that said Letters Patent is hereby corrected as shown below:

Claims

Column 22
Claim 3, Line 15, delete "dicarboxylle" insert --dicarboxylic--
Claim 6, Line 49, delete "lout" insert --least--

Column 23
Claim 9, Line 15, delete "lever" insert -- layer--

Column 25
Claim 46, Line 4, delete "mare" insert -- more--

Column 26
Claim 52, Line 16, insert --PET,-- immediately following PS, and before PVC
Claim 53, Line 22, delete "warned" insert --warmed--

Signed and Sealed this

Thirteenth Day of February, 2007

JON W. DUDAS
*Director of the United States Patent and Trademark Office*